(12) United States Patent
Drouhault et al.

(10) Patent No.: US 9,184,453 B2
(45) Date of Patent: Nov. 10, 2015

(54) COMPACT FUEL CELL

(75) Inventors: Delphine Drouhault, St Egreve (FR); Daniel Levrard, Domarin (FR); Philippe Manicardi, Fontaine (FR); Pierre Nivelon, Saint Hilaire du Touvet (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 975 days.

(21) Appl. No.: 13/383,540

(22) PCT Filed: Jul. 12, 2010

(86) PCT No.: PCT/EP2010/059966
§ 371 (c)(1),
(2), (4) Date: Jan. 11, 2012

(87) PCT Pub. No.: WO2011/006860
PCT Pub. Date: Jan. 20, 2011

(65) Prior Publication Data
US 2012/0107710 A1 May 3, 2012

(30) Foreign Application Priority Data
Jul. 15, 2009 (FR) .................................. 09 54888

(51) Int. Cl.
*H01M 8/04* (2006.01)
*H01M 8/02* (2006.01)
(Continued)

(52) U.S. Cl.
CPC ........ *H01M 8/04268* (2013.01); *H01M 8/0267* (2013.01); *H01M 8/04059* (2013.01); *H01M 8/04074* (2013.01); *H01M 8/04358* (2013.01); *H01M 8/04768* (2013.01);
(Continued)

(58) Field of Classification Search
CPC ............ H01M 8/02; H01M 8/04; H01M 8/10
USPC ......................................................... 429/437
See application file for complete search history.

(56) References Cited

U.S. PATENT DOCUMENTS

2002/0037447 A1*  3/2002  Imaseki et al. .................. 429/26
2005/0221149 A1* 10/2005  Matsubayashi et al. ........ 429/37
2005/0282060 A1  12/2005  DeFillippis et al.
(Continued)

OTHER PUBLICATIONS

International Search Report issued on Oct. 15, 2010 in PCT/EP10/059966 filed on Jul. 12, 2010.
(Continued)

*Primary Examiner* — Ula C Ruddock
*Assistant Examiner* — Daniel Gatewood
(74) *Attorney, Agent, or Firm* — Oblon, McClelland, Maier & Neustadt, L.L.P.

(57) ABSTRACT

A fuel cell including a stack of electrochemical cells and end plates applying a tightening strain onto the electrochemical cells, a thermal management system formed by a heat transfer fluid flow circuit in the stack, and a heat transfer fluid flow circuit external to the stack. The heat transfer flow circuit and the external circuit are connected in one of the end plates. The external circuit includes a first subcircuit including a heat exchanger and a second subcircuit directly connected to the inlet of the internal circuit. A thermostatic valve Is integrated in the end plate to control the heat transfer fluid flow in one and/or the other of the subcircuits as a function of temperature of the fluid at the outlet of the internal circuit.

9 Claims, 3 Drawing Sheets

(51) Int. Cl.
*H01M 8/10* (2006.01)
*H01M 8/24* (2006.01)

(52) U.S. Cl.
CPC ........... *H01M 8/1002* (2013.01); *H01M 8/248* (2013.01); *H01M 2008/1095* (2013.01); *Y02E 60/521* (2013.01)

(56) References Cited

U.S. PATENT DOCUMENTS

2006/0216554 A1   9/2006   Imaseki et al.
2007/0042247 A1   2/2007   Baird et al.
2007/0287045 A1   12/2007   Lee et al.
2008/0299429 A1   12/2008   Desrosiers et al.
2014/0017581 A1   1/2014   Drouhault et al.
2014/0045088 A1   2/2014   Drouhault et al.
2014/0106253 A1   4/2014   Drouhault et al.

OTHER PUBLICATIONS

Preliminary Search Report issued Dec. 2, 2009 in French Patent Application No. 0954888 with English Translation of Category of Cited Documents.

* cited by examiner

COMPACT FUEL CELL

TECHNICAL FIELD AND PRIOR ART

The present invention relates to a compact fuel cell with an improved thermal control.

In order to supply electricity, a fuel cell is fed with a fuel gas, for example hydrogen in the case of a proton exchange membrane fuel cell (PEMFC) type cell, and with an fuel oxidizing gas, for example air or oxygen. The operation of the fuel cell also results in generating heat energy.

Besides, the electrochemical efficiency of the cell is dependent on the temperature within the cell and this is due to the very nature of the materials used. Accordingly, this temperature should be controlled in order to obtain the highest efficiency possible. Indeed, if the operating temperature is too low, the best operating efficiency of the fuel cell cannot be achieved, and if the cell undergoes a too high temperature rise, the materials making up the cell can be damaged.

On the other hand, as explained previously, the cell generates heat upon operating. This heat should generally be removed to restrict the rise in temperature within the cell. In the case of medium to high power density cells, a flow of a heat transfer fluid internal to the cell is generally provided, this heat transfer fluid is cooled outside the cell by flowing in a heat exchanger before flowing again in the cell. The heat transfer fluid flow is generally achieved by means of a pump.

However, if during the operation, it is attempted to remove calories in order to avoid a rise in temperature, upon starting the cell, the calories removal is desired to be reduced in order to allow the fluid temperature increase and to achieve an optimal operating temperature, which is in the order of 80° C. in the case of PEMFCs.

Document US2007/0042247A describes a fuel cell provided with a thermal management system, such system comprising a circuit which is external to the cell wherein the heat transfer fluid is cooled in the heat exchanger. A thermostatic valve is provided in this circuit external to the cell to manage the heat transfer fluid flow at the outlet of the cell, and to send all or part of the heat transfer fluid to the heat exchanger. Thus, if the heat transfer fluid temperature is lower than the desired operating temperature of the cell, the heat transfer fluid is sent back into the cell without being cooled.

But this thermal management system can be very bulky. Indeed, the medium and high power fuel cells comprise all the more elements than the intended power is high. The heat power to be removed is thus all the more significant than the intended power density is high. Consequently, the heat transfer fluid circuit has large passageway cross-section areas, which increases the bulk as a whole.

But it is reminded that this kind of cell is in particular intended to be on board vehicles as a driving energy source. Consequently, its bulk is an important issue.

It is consequently an object of the present invention to provide a fuel cell equipped with a compact thermal management system with respect to the assemblies of the state of the art.

It is also an object of the present invention to provide a fuel cell equipped with a thermal management system the optimum temperature conditions of which at the start of the operation are more easily reached.

DESCRIPTION OF THE INVENTION

The objects previously set out are achieved by a fuel cell comprising a stack of electrochemical cells between two end plates applying a tightening strain onto the stack and a thermal management system comprising a flow circuit of a heat transfer fluid within the stack, the inlet and the outlet of the circuit being located in one end of the dual pole plates, and a flow circuit external to the stack comprising a subcircuit intended to provide a heat exchange between the fluid and the external environment, and a subcircuit intended to directly send the heat transfer fluid back into the stack, means for controlling the passage of the heat transfer fluid in one and/or the other of the subcircuits as a function of the temperature of the heat transfer fluid, said means being provided in said end plate.

Particularly advantageously, the control means are formed by a thermostatic valve allowing communication towards one and/or the other of subcircuits as a function of the heat transfer fluid temperature.

In other words, the fluid flow control means are integrated in the end plate connected to subcircuits, which reduces the bulk as a whole.

The subject-matter of the present invention is thus mainly a fuel cell comprising a stack of electrochemical cells and end plates applying a tightening strain onto the electrochemical cells, a thermal management system formed by a heat transfer fluid flow circuit in the stack, called internal circuit, and a heat transfer fluid flow circuit external to the stack, called external circuit, the internal circuit and the external circuit being connected at least at one of the end plates, the external circuit comprising a first subcircuit provided with a heat exchanger and a second subcircuit directly connected to the inlet of the internal circuit, a device for controlling the heat transfer fluid flow in one and/or the other of the subcircuits as a function of the temperature of said fluid at the outlet of the internal circuit, said control device being integrated in one of the end plates.

According to a characteristic of the invention, said end plate comprises a communication passageway between the internal circuit and one of the subcircuits, said passageway being perpendicular to the plane of said end plate and a communication passageway between the internal circuit and the other subcircuit, said communication passage extending in the plane of the end plate.

Said control device can be a three-way valve, a feed way of which is connected to the outlet of the internal circuit, an exhaust way of which is connected to the inlet of the first subcircuit and the other exhaust way of which is connected to the inlet of the second subcircuit.

Advantageously, said three-way valve is a thermostatic valve. This can comprise an element the volume of which varies as a function of the heat transfer fluid temperature, a shutter axially movable under the action of said element in a channel portion located between the inlet of the first subcircuit and the inlet of the second subcircuit, and two valve seats provided on either side of the shutter, the shutter cooperating with either valve seat as a function of the heat transfer fluid temperature to seal either exhaust way.

For example, said end plate comprises a collecting chamber into which the outlet of the internal circuit leads, the thermostatic valve being substantially provided at the centre of the collecting chamber, the intake way of said valve being such that the heat transfer fluid penetrating said valve surrounds the element the volume of which varies as a function of the temperature.

The collecting chamber can be in the form of an axial duct, the internal circuit laterally connecting to said collecting chamber, the shutter moving orthogonally to the axis of the duct, the inlet of the first subcircuit being located on one side of the axis of the duct and the inlet of the second subcircuit being located on the other side of the axis of the duct.

The axis of the collecting chamber is for example substantially parallel to a side of the end plate, in the vicinity of this side, the transverse channel in which the shutter moves axially leading through an end into said side and connecting to one of the subcircuits, and leads into the face of the end plate orthogonally to its axis and connects to the other subcircuit.

The fuel cell is for example of the PEMFC type.

BRIEF DESCRIPTION OF THE DRAWINGS

The present invention will be better understood using the description that follows and the drawings wherein.

DETAILED DESCRIPTION OF PARTICULAR EMBODIMENTS

Figure 1:
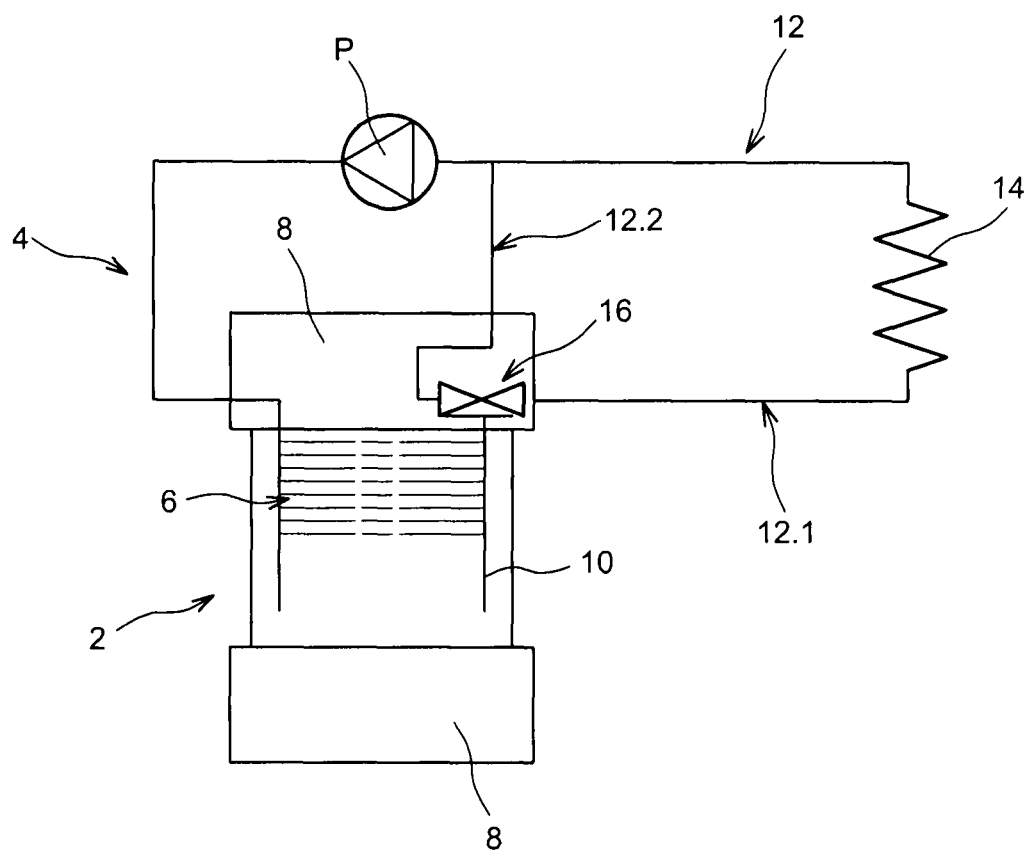
FIG. 1 is a schematic representation of a fuel cell equipped with a thermal control system according to the present invention.

In FIG. 1, a schematic representation of a fuel cell 2 equipped with a thermal control system 4 according to the present invention can be seen.

The fuel cell 22 comprises a stack 6 of electrochemical cells consisting of double pole plates and ion exchange membranes alternately provided, and two end plates 8 on either side of the stack. The end plates 8 apply a compression strain onto the stack 6 to ensure an electrical conduction evenly distributed on the entire surface of the elements making up the cells.

Besides, the feed of the cells with reactive fluid, for example hydrogen on the one hand and oxygen on the other hand, is performed through either one or both end plates 8. The end plate(s) comprise(s) feed and discharge ports both connected to a circuit within the stack, and to a feed and recovering circuit (not represented). The tightening strain applied by the end plates 8 also ensures a good tightness to reactive gases.

The thermal control system 4 comprises a heat transfer fluid flow circuit a part 10 of which allows flow within the stack 6 and another part 12 of which allows flow external to the stack 6.

The flow circuit passes through one of the end plates 8.

The part 10 of the flow circuit within the stack 6, called internal circuit, is for example directly made in the cells. The tightening strain applied by the end plates 8 also ensures a good tightness to the heat transfer fluid.

The flow circuit comprises a flow pump P to ensure flow of the heat transfer fluid in the stack and external to the same.

The part 12 of the circuit external to the stack, called external circuit 12, comprises two flow subcircuits 12.1, 12.2. The first subcircuit 12.1 comprises a heat exchanger 14 to enable the heat transfer fluid to exchange heat with the external environment, for example to give calories to the outside. But, it can be considered that it pick up calories from the external environment.

The second subcircuit 12.2 is intended to allow flow of the heat transfer fluid back into the stack without passing through the exchanger. This second subcircuit is thus hydraulically connected in parallel with the stack and the first subcircuit 12.1 and enables the fluid flow to be avoided in the first subcircuit 12.1.

The heat transfer fluid flow in either subcircuit 12.1, 12.1 is achieved by means of a three-way valve 16.

According to the present invention, the valve 16 is provided internal to one of the end plates 8, this integration enabling the bulk of the heat control system to be reduced.

In the description that follows, a single end plate 8 will be described. However, the invention can of course be concerned with both end plates.

The control valve 16 is connected to the outlet of the internal circuit 12 and to the inlets of the subcircuits 12.1, 12.2 and ensures the passage of all or part of the heat transfer fluid in either subcircuit 12.1, 12.2.

The control valve 16 is controlled as a function of the outflowing heat transfer fluid temperature.

For example, the control valve 16 can be a three-way valve controlled by a measure of the heat transfer fluid temperature, for example by means of a temperature probe dipped into the heat transfer fluid and an electronic unit controlling the state of the valve 16.

Particularly advantageously, the control valve 16 is a thermostatic valve the state of which is directly controlled by the heat transfer fluid, more particularly its temperature, without requiring further means, for example of the electronic type. Besides increase reliability and robustness of the valve control and further space saving are achieved.

In the example represented in FIGS. 2A to 3B, the end plate 8 comprises a blind duct 9 feeding the stack with the heat transfer fluid, this duct 9 is made in the plane of the plate and intercepts two transverse channels 9.1 bringing the fluid into the stack. This duct 9 forms the inlet of the internal circuit 10. The open end of the duct 9 is connected to the external circuit 12.

The end plate 8 also comprises a duct 11, forming a collecting chamber, made in the plane of the plate and intercepting two transverse channels 11.1, 11.2 from which the fluid flows out from the stack. The duct 11 forms the outlet of the internal circuit 10. In the example represented, the ducts 8 and 9 are parallel, but this arrangement is no way limiting.

Figure 2A:
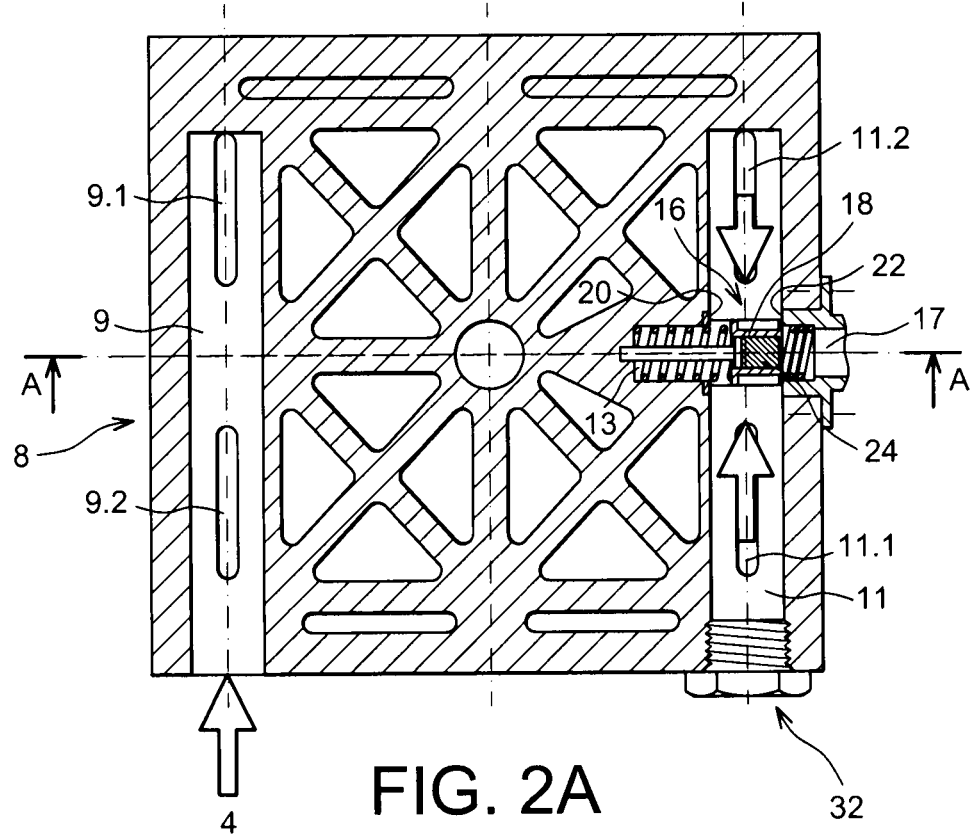
FIG. 2A is a cross-section view along the greatest surface of an exemplary end plate of the cell of FIG. 1.
Figure 2B:
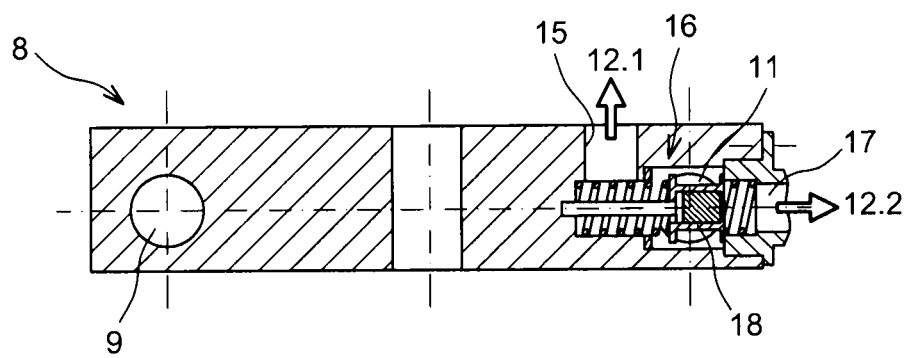
FIG. 2B is a transverse cross-section view along the plane A-A of the plate of FIG. 2A, FIGS. 3A and 3B are detailed views of FIG. 2A in two operating states.
Figure 3A:
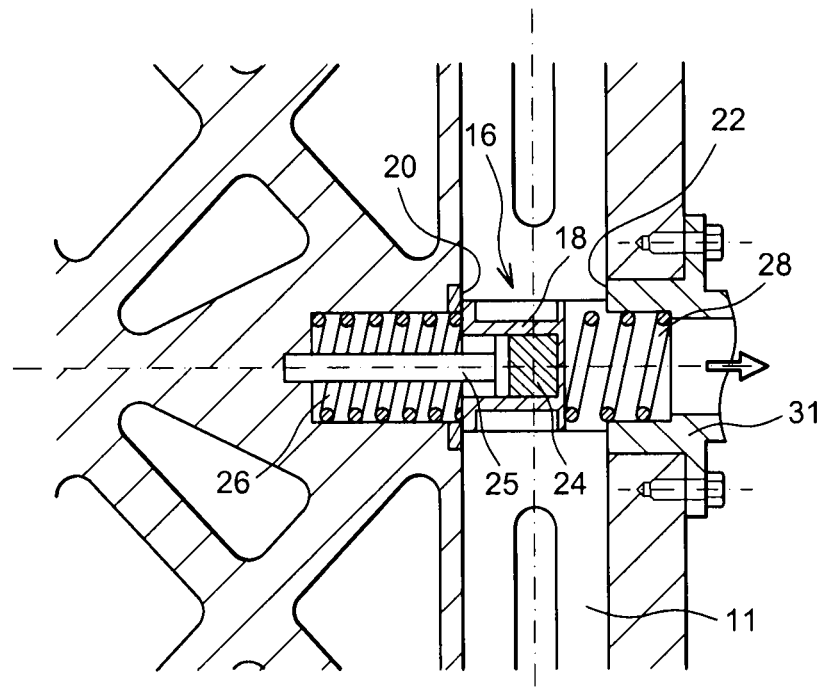
Figure 3B:
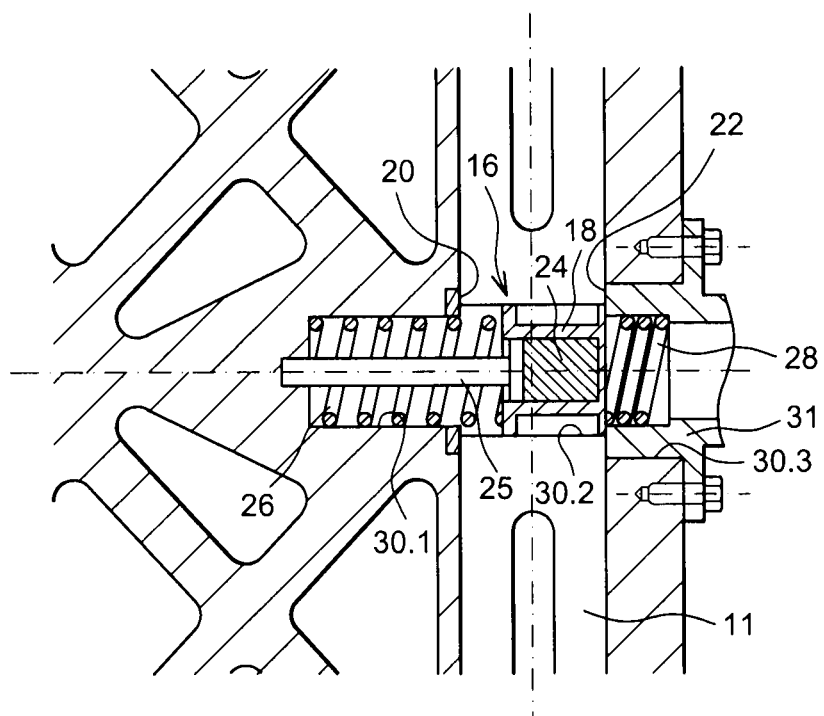

The end plate 8 also comprises a vertical passageway 15, in the representation of FIG. 2B, to connect the internal circuit 10 to the first subcircuit 12.1 and a side passageway 17 to connect the internal circuit 10 to the second subcircuit 12.2.

A channel 13 is made extending from the side passageway 17, the same crosses the duct 11, and intercepts the vertical passageway 15, thus communicating the outlet of the heat transfer fluid circuit in the stack, the inlet of the first subcircuit 12.1 and the inlet of the second subcircuit 12.2 with each other.

The thermostatic valve comprises a shutter 18 which is movable axially in the channel 13, two valve seats 20, 22, an element 24 the volume of which is sensitive to temperature and connecting the shutter to the end plate. In the example represented, the element 24 is attached to a rod 25 attached in the bottom of the channel 13. The expansion or retraction of the element 24 causes the shutter to be axially moved between both valve seats 20, 22. The element 24 is for example a wax or gas contained in a pocket. Springs 26, 28 are reactingly mounted between the passageway 13 and the movable shutter 18 allowing the shutter to be returned into position and kept in place. A valve seat 20 is located between the outlet of the heat transfer fluid and the inlet of the first subcircuit 12.1, the cooperation between the shutter 18 and this seat 20 closing the communication between the outlet of the fluid and the first subcircuit. The second valve seat 22 is located between the outlet of the heat transfer fluid and the inlet of the second subcircuit 12.2, the cooperation between the shutter 18 and this seat 22 closing the communication between the outlet of the fluid and the second subcircuit 12.2.

In the example shown, the channel 13 is formed by three concentric bores 30.1, 30.2, 30.3 with an increasing diameter, the first valve seat 20 being formed by the diameter difference between the first and second bores 30.1, 30.2.

The second valve seat is formed by mounting a ring 31 in the side passageway 17.

The valve seats 20, 22 can be covered with a particular material to ensure a good contact with the shutter and restrict the leaks between the shutter and the seat it contacts.

The spring 26 rests between the bottom of the channel 13 and the shutter 18, and the spring 28 rests between a shoulder made in the ring 31 and the shutter 18.

A plug 32 is provided at the open end of the duct 11 to close the duct 11.

In the example represented, the communication passageway 15 with the first subcircuit 12.1 is perpendicular to the plane of the plate and the communication passageway 17 with the second subcircuit 12.2 is on the plane of the end plate. This particular orientation enables the connection of the end plate 8 to the first and second subcircuits 12.1, 12.2 to be simplified.

Particularly advantageously, the inlet port of the control valve 16 extends on either side of the temperature sensitive element 24. Thus, it is dipped into the heat transfer fluid, which makes it even more sensitive to the heat transfer fluid temperature variation, and as a result, it quickly reacts.

The operation of the cell according to the present invention, and more particularly its thermal control system will now be described.

Upon starting the fuel cell 2, the heat transfer fluid flows in the part 10 of the flow circuit. The heat transfer fluid, called cold fluid, has a temperature lower than the desired operating temperature of the cell.

The cold fluid is in contact with the control valve 12, the temperature sensitive element 24 retracts, the shutter contacts the valve seat 20, closes the passageway 30, discontinuing the communication between the first subcircuit 12.1 and the circuit within the stack. The heat transfer fluid then flows in the passageway 17 and the second subcircuit 12.2 and is directly sent back into the stack. The heat transfer fluid is then not cooled in the heat exchanger and the calories it could pick up by flowing in the stack are directly reintroduced into the stack facilitating the temperature increase of the stack. Generally, the heat transfer fluid is permanently in the stack, even out of the operating phases, consequently out of operation, the shutter rests against the seat 20.

The temperature within the cell, and in fact that the heat transfer fluid, gradually increases. The temperature sensitive element 24 gradually expands, the shutter 18 comes off the seat 24, the heat transfer fluid then flows in both subcircuits 12.1, 12.2, the position of the shutter controlling the distribution between both subcircuits. The opening/closing temperature range for the thermostatic valve is suitably chosen, the control being carried out gradually.

Then, when the cell reaches its operating temperature, it is necessary to extract calories to restrict the exceeding of the desired operating temperature. The heat transfer fluid must then discharge calories released within the stack. The heat transfer fluid has now a temperature substantially equal to that of the stack, it is considered as warm.

The warm heat transfer fluid contacts with the temperature sensitive element 24, the same expands, the shutter contacts the valve seat 22, closes the passageway 17, discontinuing the communication between the second subcircuit and the circuit within the stack. The heat transfer fluid then flows in the passageway 15 and in the first subcircuit 12.1. Then, it passes through the heat exchanger, and loses calories. The cooled heat transfer fluid penetrates again the stack.

The cell operation occurs in an optimum temperature range. The beginning of the thermostatic valve opening range corresponds to the low threshold of the optimum operating temperature: only a part of the fluid is then bypassed to be cooled. If the fluid temperature increases, this proportion increases, until the entire fluid is deviated when the high threshold of the operating range is reached.

The integration of the control valve in the end plate(s) does not require changing the external dimensions of the end plate(s). Indeed, in order to provide the main function of the same, which is a mechanical tightening function, the end plates have a relatively high thickness. Consequently, it is easy to integrate a control valve without changing the initial bulk of the plate and without significant technical difficulty, for example for machining. The required heat transfer fluid flow rates can be achieved.

An exemplary sizing of such a control valve will now be given.

Let us consider the example of 30 kW PEMFC type cell, one of the end plates of which has a thickness in the order of 40 mm. This plate thickness enables a thermostatic valve comprising an expansion volume in the order of 1 $cm^3$ to be integrated, which enables selective flow of a heat transfer fluid, such as deionised water, in the order of 2 $m^3$/h with passageway cross-section areas at the ports in the order of 500 $mm^2$ for a head loss in the order of 50 mbar.

The displacement of the shutter in the present example is in the order of 5 mm.

The valve according to the present invention advantageously enables only a very restricted number of mechanical pieces to be used to manage the heat transfer fluid flow as a function of its temperature. Indeed, the valve comprises two springs, a shutter and a temperature sensitive element and a reduced number of bores. In the example represented, it comprises four concentric bores. The industrial manufacturing is therefore facilitated and the production cost is limited.

The present invention, besides its reduced bulk, enables the heat losses at the start of the operation of the cell to be restricted and thus allows a temperature increase which is quicker than in the state of the art. Indeed, the arrangement of the control valve in one of the end plates provides a second subcircuit with a direct flow back into the stack with a reduced length, which restricts the unavoidable heat losses. The second subcircuit can further be thermally insulated to reduce the heat losses.

Of course, any other device able to direct the heat transfer fluid flow into either subcircuit as a function of the transfer fluid temperature, when it flows out from the stack, does not depart from the scope of the present invention.

Both end plates can be equipped with a thermostatic valve, for example in the case of a large stack, or in the case where the cooling circuit makes both end plates of an equal temperature, in order to remove heat at both ends of the stack.

The invention claimed is:

1. A fuel cell comprising:
   a stack of electrochemical cells and end plates applying a tightening strain onto the electrochemical cells;
   a thermal management system including a heat transfer fluid flow internal circuit in the stack;
   a heat transfer fluid flow external circuit external to the stack, the internal circuit and the external circuit being connected at least at one of the end plates, the external circuit including a first subcircuit including a heat exchanger and a second subcircuit directly connected to an inlet of the internal circuit; and a device for controlling flow of heat transfer fluid in either or both subcircuits as a function of temperature of the fluid at an outlet of the internal circuit, the control device being integrated in the end plate, the end plate including a communication passageway between the internal circuit and one of the subcircuits, the passageway being perpendicular to a plane of the end plate and a communication passageway between the internal circuit and the other subcircuit, the communication passageway extending in the plane of the end plate, the control device being a three-way valve, an inlet of the three-way valve is connected to the outlet of the internal circuit, a first outlet of the three-way valve is connected to the inlet of the first subcircuit, and a second outlet of the three-way valve is connected to the inlet of the second subcircuit.

2. The fuel cell according to claim 1, wherein the three-way valve is a thermostatic valve.

3. The fuel cell according to claim 2, wherein the three-way valve includes an element having a volume which varies as a function of the temperature of the heat transfer fluid, a shutter axially movable under action of the element in a channel portion located between the inlet of the first subcircuit and the inlet of the second subcircuit, and two valve seats provided on either side of the shutter, the shutter cooperating with either valve seat as a function of the temperature of the heat transfer fluid to seal either outlet of the three-way valve.

4. The fuel cell according to claim 3, wherein the end plate includes a collecting chamber into which the outlet of the internal circuit leads, the thermostatic valve being substantially provided at a center of the collecting chamber, the inlet of the three-way valve being such that the heat transfer fluid penetrating the three-way valve surrounds the element having a volume which varies as a function of the temperature.

5. The fuel cell according to claim 4, wherein the collecting chamber is in a form of an axial duct, the internal circuit being laterally connected to the collecting chamber, the shutter moving orthogonally to an axis of the duct, the inlet of the first subcircuit being located on one side of the axis of the duct and the inlet of the second subcircuit being located on the other side of the axis of the duct.

6. The fuel cell according to the preceding claim 4, wherein an axis of the collecting chamber is substantially parallel to a side of the end plate, in a vicinity of the side of the end plate, the channel portion in which the shutter moves axially leading through an end into the side and connecting to one of the subcircuits, and leads into a face of the end plate orthogonally to its axis and connects to the other subcircuit.

7. The fuel cell according to the preceding claim 5, wherein an axis of the collecting chamber is substantially parallel to a side of the end plate, in a vicinity of the side of the end plate, the channel portion in which the shutter moves axially leading through an end into the side and connecting to one of the subcircuits, and leads into a face of the end plate orthogonally to its axis and connects to the other subcircuit.

8. The fuel cell according to claim 1, wherein the cell is of PEMFC type.

9. The fuel cell according to claim 2, wherein the cell is of PEMFC type.

* * * * *